(12) United States Patent
Mu (10) Patent No.: US 12,273,895 B2
(45) Date of Patent: Apr. 8, 2025

(54) DOWNLINK CONTROL INFORMATION TRANSMISSION METHOD, AND COMMUNICATION DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 335 days.

(21) Appl. No.: 17/792,753

(22) PCT Filed: Jan. 15, 2020

(86) PCT No.: PCT/CN2020/072286
§ 371 (c)(1),
(2) Date: Jul. 14, 2022

(87) PCT Pub. No.: WO2021/142665
PCT Pub. Date: Jul. 22, 2021

(65) Prior Publication Data
US 2023/0057205 A1    Feb. 23, 2023

(51) Int. Cl.
*H04W 72/23* (2023.01)
*H04L 1/00* (2006.01)
*H04W 72/1263* (2023.01)

(52) U.S. Cl.
CPC .......... *H04W 72/23* (2023.01); *H04L 1/0003* (2013.01); *H04W 72/1263* (2013.01)

(58) Field of Classification Search
CPC .............. H04W 72/23; H04W 72/1263; H04L 1/0003; H04L 1/0016; H04L 1/0009; H04L 1/0007; H04L 1/0023; H04L 1/1893; H04L 27/362; H04L 5/0053; H04L 5/0064; H04L 27/0008; H04L 5/0091; Y02D 30/70
USPC ......................................... 370/310, 328, 329
See application file for complete search history.

(56) References Cited

U.S. PATENT DOCUMENTS

| 2018/0241499 A1* | 8/2018 | Einhaus | H04L 5/0096 |
| 2020/0374163 A1* | 11/2020 | Zhao | H04L 5/0094 |

FOREIGN PATENT DOCUMENTS

CN    108023666 B    7/2020

OTHER PUBLICATIONS

Indian Patent Application No. 202247045511, Office Action dated Nov. 15, 2022, 6 pages.

* cited by examiner

*Primary Examiner* — Obaidul Huq
(74) *Attorney, Agent, or Firm* — Cozen O'Connor (57) ABSTRACT

A method for transmitting downlink control information (DCI) and a communication device are provided. The method includes: sending downlink control information (DCI) based on a first mapping relationship, in which the first mapping relationship is a correspondence between a resource quantity and a transport block size (TBS) value configured for a first kind of terminal, and the first mapping relationship includes a first correspondence for a first modulation and coding scheme (MCS) and a second correspondence for a second MCS. The second correspondence includes a correspondence selected from a second mapping relationship between a resource quantity and a TBS value configured for a second kind of terminal and different from the first correspondence.

18 Claims, 4 Drawing Sheets

DOWNLINK CONTROL INFORMATION TRANSMISSION METHOD, AND COMMUNICATION DEVICE

CROSS-REFERENCE TO RELATED APPLICATION

This application is a U.S. national phase of International Application No. PCT/CN2020/072286, filed with the State Intellectual Property Office of P. R. China on Jan. 15, 2020.

TECHNICAL FIELD

The disclosure relates to a field of wireless communication technologies, and particularly to a method for transmitting downlink control information (DCI), and a communication device.

BACKGROUND

Recently, the vigorous development of Internet-to-Things has resulted in increased convenience in the life and work of user. Machine Type Communication (MTC) and Narrow Band Internet of Things (NB-IoT) are typical representations of cellular Internet-to-Things technologies. These technologies have been widely used in a smart city, for example meter reading, a smart agriculture, for example collecting information such as temperature and humidity, a smart transportation, for example bicycle sharing, and so on.

SUMMARY

According to a first aspect of disclosure, a method for transmitting downlink control information (DCI) is provided. The method includes sending downlink control information (DCI) based on a first mapping relationship, in which the first mapping relationship is a correspondence between a resource quantity and a transport block size (TBS) value configured for a first kind of terminal, and the first mapping relationship includes a first correspondence for a first modulation and coding scheme (MCS) and a second correspondence for a second MCS. The second correspondence includes a correspondence selected from a second mapping relationship between a resource quantity and a TBS value configured for a second kind of terminal and different from the first correspondence.

According to a second aspect of the disclosure, a method for transmitting downlink control information (DCI) is provided. The method includes receiving downlink control information (DCI), in which the DCI is sent based on a first mapping relationship, in which the first mapping relationship is a correspondence between a resource quantity and a transport block size (TBS) value configured for a first kind of terminal, and the first mapping relationship includes a first correspondence for a first modulation and coding scheme (MCS) and a second correspondence for a second MCS. The second correspondence includes a correspondence selected from a second mapping relationship between a resource quantity and a TBS value configured for a second kind of terminal and different from the first correspondence.

According to a third aspect of the disclosure, a communication device is provided. The communication device includes: an antenna, a memory and a processor. The processor is coupled to the antenna and the memory respectively, and configured to execute executable programs stored in the memory to control the antenna to receive and send wireless signals and perform the method for transmitting DCI according to any of the above-mentioned aspects.

According to a fourth aspect of the disclosure, a non-transitory computer-readable storage medium is provided. The non-transitory computer-readable storage medium has executable programs stored thereon. When the executable programs are executed by a processor, steps of the method for transmitting DCI according to any of the above-mentioned aspects are implemented.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

Since MTC (Machine Type Communication) and NB-IoT (Narrow Band Internet of Things) are mostly deployed in a basement, and a coverage capability is inferior to a conventional LTE user due to a hardware restriction of a device, retransmission is adopted in the MTC and NB-IoT to accumulate power, so as to realize coverage enhancement. Simply, the retransmission refers to transmitting same contents in multiple time units. The time unit may be a sub-frame, or may be multiple sub-frames.

Further, since MTC is mostly deployed in a scenario where it is difficult to charge or change a battery, for example, in the wild or a basement, power saving of MTC and NB-IoT is a significant characteristic of MTC and NB-IoT.

In the NB-IoT, a Modulation coding strategy (MCS) and a Transfer Block Size (TBS). For a downlink of the NB-IoT, DCI includes an MCS field occupying four bits and used to indicate an index (I_MCS) of the downlink MCS, and an index (I_TBS) of the TBS can be determined based on a relationship between the MCS index and the TBS index. In the downlink, I_MCS=I_TBS. Further, the transmitted TBS can be determined based on the TBS index and allocated resource amount. However, with development of technology, multiple kinds of terminals are developed, for example, the NB-IoT device. For various kinds of terminals, how to design the relationship between the resource amount and the TBS value and how to meet requirements of further development of the communication technology (for example, meeting the requirement on capacity expanding or power consumption decreasing of communication while being able to compatible with the prior art) are urgent problems to be solved.

The disclosure provides a method and an apparatus for transmitting downlink control information (DCI), a communication device and a storage medium.

Figure 1:
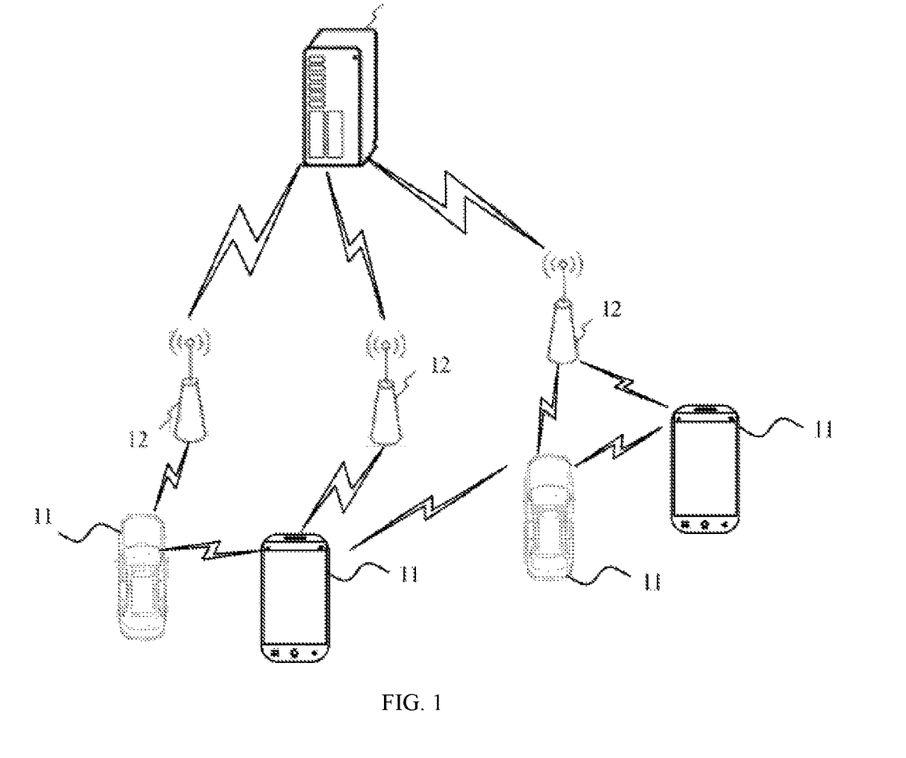
FIG. 1 is a schematic diagram illustrating a wireless communication system according to an embodiment.

With reference to FIG. 1, FIG. 1 is a schematic diagram illustrating a wireless communication system according to an embodiment. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to a user. The terminal 11 can communicate with one or more core networks via a radio access network (RAN). The terminal 11 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be an in-vehicle device, for example, the terminal 11 may be a vehicle-mounted computer with a wireless communication function, or a wireless communication device externally connected to a vehicle-mounted computer. Alternatively, the terminal 11 may also be a roadside device, for example, a road light with a wireless communication function, a traffic light or other roadside devices and so on.

The base station 12 may be a network side device in the wireless communication system. The wireless communication system may be a 4th generation mobile communication (4G) system, also known as the long term evolution (LTE) system. Alternatively, the wireless communication system may also be a 5G system, also known as the new radio (NR) system. Alternatively, the wireless communication system may also be a next-generation system of the 5G system. An access network in the 5G system may be called as a new generation radio access network (NG-RAN), or a machine-type communication system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the terminal 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the terminals 11, for example a vehicle to vehicle (V2V) communication, a vehicle to infrastructure (V2I) communication, vehicle to pedestrian (V2P) communication and other scenarios in the vehicle to everything (V2X) communication.

Alternatively, the wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

Figure 2:
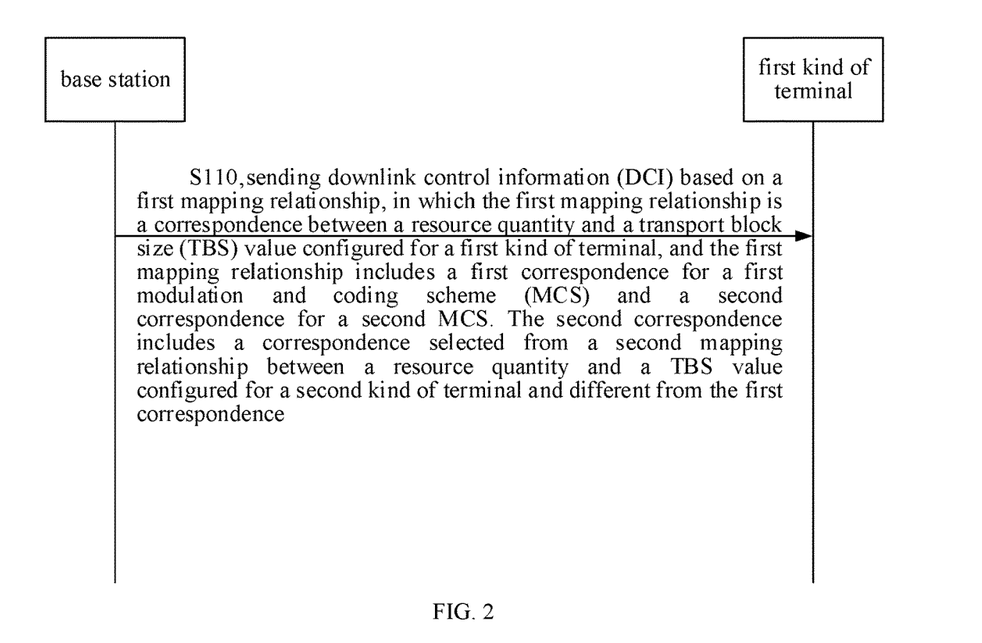
FIG. 2 is a flowchart illustrating a method for transmitting downlink control information (DCI) according to an embodiment of the disclosure.

As illustrated in FIG. 2, the embodiments of the disclosure provide a method for transmitting downlink control information (DCI). The method includes the followings.

At block S110, DCI is sent based on a first mapping relationship. The first mapping relationship is a correspondence between a resource quantity and a transport block size (TBS) value configured for a first kind of terminal, and the first mapping relationship includes a first correspondence for a first modulation and coding scheme (MCS) and a second correspondence for a second MCS.

The second correspondence includes a correspondence selected from a second mapping relationship between a resource quantity and a TBS value configured for a second kind of terminal and different from the first correspondence.

The method for transmitting DCI according to the embodiment can be applied in a base station.

For example, the DCI is sent on a physical downlink control channel (PDCCH).

The DCI includes an MCS field. The MCS field at least carries an MCS index configured to indicate the MCS. The MCS has a mapping relationship with the TBS value and the resource quantity. Accordingly, by carrying the MCS index in the MCS field, the MCS, the TBS value and the resource quantity can be indicated having the characteristic of small overhead in bits of the DCI.

In the embodiment of the disclosure, the first mapping relationship includes a correspondence between the MCS, the resource quantity and the TBS value. In this way, with the MCS index carried in the MCS field, on the basis of adding the second MCS, the index of the second MCS can be indicated through the original MCS field in the DCI, and the resource quantity and the TBS value can be indicated to the first kind of terminal.

For example, in a downlink transmission, the MCS index is typically equal to the TBS index. The base station may realize indication of the MCS index on one hand and realize indexing of the TBS value on the other hand through the MCS index carried in the MCS field of the DCI, and further realize indication of the resource quantity based on the correspondence between the TBS value and the resource quantity.

In the embodiment of the disclosure, the DCI is sent based on the first mapping relationship. The first mapping relationship is the correspondence between the resource quantity and the TBS value configured for the first kind of terminal. The second mapping relationship is the correspondence between the resource quantity and the TBS value configured for the second kind of terminal.

The first kind of terminal is different from the second kind of terminal. The second kind of terminal has stored energy greater than a storage of the first kind of terminal. For another example, the second kind of terminal has a transmitting power higher than a transmitting power of the first kind of terminal.

In some embodiments, the first kind of terminal may be a narrow band-internet of things (NB-IoT) device. The second kind of terminal may be a normal terminal, for example a long term evolution (LTE) terminal.

A physical transmission rate corresponding to the first MCS is lower than a physical transmission rate corresponding to the second MCS. For example, the second MCS is a higher order of modulation and coding strategy than the first MCS.

For example, the first MCS includes but is not limited to a binary phase shift keying (BPSK). For example, the second MCS includes but is not limited to a quadrature amplitude modulation (QAM), for example the QAM is 16 QAM.

In the embodiments of the disclosure, the first mapping relationship includes the first correspondence for the first MCS and the second correspondence for the second MCS.

In this case, the TBS value included in the second correspondence corresponding to the second MCS comes from the second mapping relationship.

In the embodiments of the disclosure, the resource quantity includes but is not limited to the number of physical resource blocks (PRBs), or the number of sub-frames/time slots/symbols.

The TBS which can be used by the terminal is a set of discrete positive integers specified by a protocol. Each TBS value in the set has a one-to-one correspondence with one certain TBS index and a certain resource quantity. The TBS index may be derived from the MCS index in the DCI based on a predetermined relationship. The resource quantity is indicated by the DCI.

In the embodiments of the disclosure, the second correspondence for the second MCS is introduced into the first mapping relationship, and the TBS value used in the second correspondence comes from the second mapping relationship of the second kind of terminal. In this way, in the wireless communication system, the TBS value adapted to the second MCS is introduced without adding a new TBS value, which has a high compatibility with the prior art and meets a high transmission efficiency of the higher order of MCS.

Table 1 shows the first correspondence of the first kind of terminal.

TABLE 1

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

In the embodiments of the disclosure, each element in Table 1 exists independently. These elements are listed in the same table for example, but it does not mean that all elements in the table should exist at the same time, as shown in the table. For example, when $I_{SF}=7$, $I_{TBS}=13$, the TBS value is 2536, while the value of the element is independent on the value of any other element in Table 1. Thus, those skilled in the art may understand that the value of each element in Table 1 can be considered as an independent embodiment.

Table 2 shows the second mapping relationship of the second kind of terminal.

TABLE 2

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |

TABLE 2-continued

| $I_{TBS}$ | \multicolumn{10}{c}{$N_{PRB}$} | | | | | | | | | |
|---|---|---|---|---|---|---|---|---|---|---|
| | 1 | 2 | 3 | 4 | 5 | 6 | 7 | 8 | 9 | 10 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

Similar to Table 1, each element in Table 2 exists independently. These elements are listed in the same table for example, but it does not mean that all elements in the table should exist at the same time, as shown in the table. The value of each element is independent on the value of any other element in Table 2. Thus, those skilled in the art may understand that the value of each element in Table 2 can be considered as an independent embodiment.

Table 3 shows the first mapping relationship of the first kind of terminal.

TABLE 3

| $I_{TBS}$ | \multicolumn{10}{c}{$N_{PRB}$} | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |

Similar to Table 1 and Table 2, each element in Table 3 exists independently. These elements are listed in the same table for example, but it does not mean that all elements in the table should exist at the same time, as shown in the table. The value of each element is independent on the value of any other element in Table 3. Thus, those skilled in the art may understand that the value of each element in Table 3 can be considered as an independent embodiment.

In Table 1 and Table 2, $I_{TBS}$ represents the TBS index, $N_{PRB}$ and $I_{SF}$ represent the resource quantity. $N_{PRB}$ and $I_{SF}$ have a correspondence as shown in Table 4.

TABLE 4

| $I_{SF}$ | $N_{PRB}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Similar to Table 1, Table 2 and Table 3, each correspondence in Table 4 exists independently. These correspondences are listed in the same table for example, but it does not mean that all correspondences in the table should exist at the same time, as shown in the table. The existence of each correspondence is independent on any other correspondence in Table 4. Thus, those skilled in the art may understand that each correspondence in Table 4 can be considered as an independent embodiment.

The correspondence between the resource quantity and the TBS value that is indicated by $I_{TBS}$ with the value of 14-26 in Table 2 is included in the second mapping relationship but not included in the first mapping relationship.

Table 3 shows the first mapping relationship including the first correspondence and the second correspondence. In Table 3, the correspondence indicated by $I_{TBS}$ with the value of 1-13 is the first correspondence, while the correspondence indicated by $I_{TBS}$ with the value of 14-20 is the second correspondence. By comparing Table 2 and Table 3, it can be seen that the second correspondence comes from the correspondence indicated by $I_{TBS}$ with the value of 14-26 in the second mapping relationship rather than from the first mapping relationship. Or, at least the TBS value in the second correspondence comes from the TBS value included in the correspondence indicated by $I_{TBS}$ with the value of 14-26.

In some embodiments, the TBS index has a predetermined correspondence between the MCS index carried in the MCS field, for example, the MCS index is the same as the TBS index.

The TBS value mapping to a resource quantity in the second correspondence is greater than the TBS value mapping to the same resource quantity in the first correspondence.

The second MCS is a higher order of MCS than the first MCS. For the same resource quantity in the second correspondence and the first correspondence, the corresponding TBS value is higher in the second correspondence.

For example, assuming that the current resource quantity is N, the TBS value which can be used by the terminal and corresponds to N in the first correspondence is smaller than the TBS value which can be used by the terminal and corresponds to N in the second correspondence.

For example, the maximum TBS value in the first correspondence is 680 bit, then each TBS value included in the second correspondence is greater than 680 bit.

In detail, the minimum TBS value mapped in the second correspondence is the minimum TBS value selected from the second mapping relationship and greater than the maximum TBS value mapped in the first correspondence.

For example, the maximum TBS value corresponding to the resource quantity in the first correspondence is 680 bit, in this case, the minimum TBS value corresponding to the resource quantity in the second correspondence is the minimum TBS value greater than 680 bit in the second mapping relationship. For example, the minimum value greater than 680 bit is 744 bit, then 744 bit is the minimum TBS value mapping to the resource quantity in the second correspondence.

In some embodiments, a maximum TBS value mapping to a resource quantity in the second correspondence is a maximum value selected from the second mapping relationship and not greater than a predetermined multiple of a first TBS value mapping to the same resource quantity in the first correspondence.

For example, the predetermined multiple of the first TBS value is a specific TBS value. The maximum TBS value in the second mapping relationship is greater than the TBS value in the first mapping relationship, and is the maximum value among multiple TBS values smaller than or equal to the predetermined multiple of the first TBS value.

For example, the TBS values mapping to the resource quantity in the second mapping relationship include S TBS values greater than the TBS values mapping to the resource quantity in the first correspondence and multiple TBS values smaller than the specific TBS value. In this case, the maximum value in the second correspondence is configured the maximum TBS value in the second mapping relationship.

In some embodiments, the predetermined multiple may be any positive integer set in advance, for example, 2, 4 or the like.

In the embodiment of the disclosure, a product of the first TBS value and the predetermined multiple may be smaller than or equal to the maximum TBS value in the second mapping relationship. In this way, it can be ensured that a TBS value not existing in the original wireless communication system cannot be introduced into the second correspondence.

In some embodiments, when the TBS value mapping to the same resource quantity in the first correspondence includes a second TBS value, the first TBS value is the second TBS value.

For example, if the TBS value mapped in the first correspondence includes a predetermined second TBS value, the first TBS value is the second TBS value.

When the TBS value mapping to the same resource quantity in the first correspondence does not include the second TBS value, the first TBS value is a maximum TBS value mapping to the same resource quantity in the first correspondence.

For example, when the TBS value mapped in the first correspondence is smaller than the second TBS value, the first TBS value may be the maximum TBS value mapping to the resource quantity in the first correspondence.

In the some embodiments, the TBS value mapping to a resource quantity in the second correspondence includes a minimum TBS value and a maximum TBS value.

The TBS value mapping to a resource quantity in the second correspondence further includes all TBS values between the minimum TBS value and the maximum TBS value, mapping to the corresponding resource quantity in the second mapping relationship.

If all the determined TBS values between the minimum TBS value and the maximum TBS value extracted from the second mapping relationship construct the second correspondence, the formed first mapping relationship may be shown in Table 3.

In some other embodiments, the TBS value mapping to a resource quantity in the second correspondence includes a minimum TBS value and a maximum TBS value.

The TBS value mapping to a resource quantity in the second correspondence further includes a part of TBS values between the minimum TBS value and the maximum TBS value, mapping to the corresponding resource quantity in the second mapping relationship.

For example, the maximum TBS value and the minimum TBS value mapping to a resource quantity in the second correspondence have been determined, in this case, between the maximum TBS value and the minimum TBS value, there are multiple TBS values mapping to the resource quantity in the second mapping relationship. In some embodiments, all the multiple TBS values may be added to the second correspondence, or a part of the multiple TBS values are added to the second correspondence as the TBS value mapping to the resource quantity.

If a part of the determined TBS values between the minimum TBS value and the maximum TBS value extracted from the second mapping relationship construct the second correspondence, the formed first mapping relationship may be shown in Table 5. For example, in Table 5, when $N_{PRB}$ is 1 and 2, the TBS values corresponding to $I_{TBS}$ with the value of 14-17 are introduced into the second correspondence; when $N_{PRB}$ is 3, the TBS values corresponding to $I_{TBS}$ with the value of 14-16 are introduced into the second correspondence, referring to the TBS values in the dashed box as shown in Table 5.

TABLE 5

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 328 | 632 | 968 | 1224 | 1544 | 1800 | 2152 | 2472 | 2728 | 3112 |
| 16 | 376 | 776 | 1064 | 1288 | 1608 | 1928 | 2280 | 2600 | 2984 | 3240 |
| 17 | 440 | 904 | 1288 | 1416 | 1800 | 2152 | 2536 | 2856 | 3240 | 3624 |

Similar to Table 1-Table 4, each element in Table 5 exists independently. These elements are listed in the same table for example, but it does not mean that all elements in the table should exist at the same time, as shown in the table. The value of each element is independent on the value of any other element in Table 5. Thus, those skilled in the art may understand that the value of each element in Table 5 can be considered as an independent embodiment.

In some embodiments, when the TBS value mapping to a resource quantity in the first correspondence includes a second TBS value, the TBS value included in the second correspondence for the corresponding resource quantity is determined based on a size relation between a maximum TBS value mapping to the corresponding resource quantity in the second mapping relationship and a predetermined multiple of the second TBS value.

For example, one or more TBS values included in the second correspondence for the resource quantity is determined based on the size relation between the maximum TBS value and the predetermined multiple of the second TBS value.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value as follows.

If the maximum TBS value mapping to the resource quantity in the second mapping relationship is smaller than the predetermined multiple of the second TBS value, a third TBS value included in the second mapping relationship is configured as the TBS value mapped in the second correspondence.

The third TBS value is a maximum TBS value smaller than the predetermined multiple of the second TBS value in the second mapping relationship.

In the embodiments of the disclosure, for example, it is determined that the maximum TBS value in the second correspondence is smaller than the third TBS value in the above-mentioned way, in the embodiment, the third TBS value is added to the second correspondence as the TBS value mapping to the resource quantity. For example, the second TBS value is 680 bit, the predetermined multiple is 2. Since 680*2=1360, the maximum value smaller than 1360 in Table 2 may be determined as 1352. The second correspondence is obtained in this way, and the formed first mapping relationship may be shown in Table 6.

TABLE 6

| $I_{TBS}$ | \multicolumn{10}{c}{$N_{PRB}$} | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1352 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1352 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | [256] | [552] | 840 | [1128] | 1352 | 1736 | 1992 | 2880 | 260 | 2856 |
| 15 | [280] | [600] | [904] | [1224] | 1544 | 1800 | 2152 | 2472 | 2728 | 3112 |
| 16 | [328] | [632] | [968] | [1288] | 1608 | 1928 | 2280 | 2600 | 2894 | 3240 |
| 17 | [336] | [696] | [1064] | 1352 | 1800 | 2152 | 2536 | 2856 | 3240 | 3624 |
| 18 | [376] | [776] | [1160] | 1544 | 1992 | 2344 | 27922 | 3112 | 3624 | 4008 |
| 19 | [408] | [840] | [1288] | 1736 | 2152 | 2600 | 2984 | 3496 | 3880 | 4264 |
| 20 | [440] | [904] | 1352 | 1864 | 2344 | 2792 | 3240 | 3752 | 4136 | 4584 |

Similar to Table 1-Table 5, each element in Table 6 exists independently. These elements are listed in the same table for example, but it does not mean that all elements in the table should exist at the same time, as shown in the table. The value of each element is independent on the value of any other element in Table 6. Thus, those skilled in the art may understand that the value of each element in Table 6 can be considered as an independent embodiment.

In Table 6, the TBS values in the box are newly introduced into the first mapping relationship as the TBS values in the second correspondence. The TBS value of 1352 in back is the third TBS value, which is introduced into the second correspondence.

In some other embodiments, the TBS value included in the second correspondence for the corresponding resource quantity is determined based on the size relation between the maximum TBS value mapping to the corresponding resource quantity in the second mapping relationship and the predetermined multiple of the second TBS value as follows.

If the maximum TBS value mapping to a resource quantity in the second mapping relationship is smaller than the predetermined multiple of the second TBS value, a maximum TBS value corresponding to the resource quantity introduced from the second mapping relationship into the second correspondence is modified to a third TBS value. The third TBS value is a maximum TBS value smaller than the predetermined multiple of the second TBS value in the second mapping relationship.

In this way, it is equivalent to modifying the maximum TBS value corresponding to a resource quantity determined in the above-mentioned way to the third TBS value.

For example, the second TBS value is 680 bit, the predetermined multiple is 2. Since 680*2=1360, the maximum value smaller than 1360 in Table 7 may be determined as 1352. The second correspondence is obtained in this way.

TABLE 7

| $I_{TBS}$ | \multicolumn{10}{c}{$N_{PRB}$} | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | [1288]/1352 |
| 8 | 120 | 256 | 392 | 536 | 680 | 808 | 968 | 1096 | 1256 | 1384 |
| 9 | 136 | 296 | 456 | 616 | 776 | 936 | 1096 | [1288]/1352 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | [1288]/1352 | 1544 | 1800 | 2024 | 2280 | 2536 |
| 14 | [256] | [552] | 840 | [1128] | 1416 | 1736 | 1992 | 2280 | 2600 | 2856 |
| 15 | [280] | [600] | [904] | [1224] | 1544 | 1800 | 2152 | 2472 | 2728 | 3112 |
| 16 | [328] | [632] | [968] | [1288]/1352 | 1608 | 1928 | 2280 | 2600 | 2984 | 3240 |
| 17 | [336] | [696] | [1064] | 1416 | 1800 | 2152 | 2536 | 2856 | 3240 | 3624 |
| 18 | [376] | [776] | [1160] | 1544 | 1992 | 2344 | 2792 | 3112 | 3624 | 4008 |
| 19 | [408] | [840] | [1288]/1352 | 1736 | 2152 | 2600 | 2984 | 3496 | 3880 | 4264 |
| 20 | [440] | [904] | 1384 | 1864 | 2344 | 2792 | 3240 | 3752 | 4136 | 4584 |

Similar to Table 1-Table 6, each element in Table 7 exists independently. These elements are listed in the same table for example, but it does not mean that all elements in the table should exist at the same time, as shown in the table. The value of each element is independent on the value of any other element in Table 7. Thus, those skilled in the art may understand that the value of each element in Table 7 can be considered as an independent embodiment.

In Table 7, the TBS values in the box are newly introduced into the first mapping relationship to form the TBS values in the second correspondence. The TBS value of 1228 is modified to 1352 which is the maximum TBS value smaller than 1360.

In some other embodiments, the TBS value included in the second correspondence for the corresponding resource quantity is determined based on the size relation between the maximum TBS value mapping to the corresponding resource quantity in the second mapping relationship and the predetermined multiple of the second TBS value as follows.

If a resource quantity is within a predetermined range and the maximum TBS value mapping to the corresponding resource quantity in the second mapping relationship is smaller than the predetermined multiple of the second TBS value, a third TBS value included in the second mapping relationship is configured as the TBS value mapped in the second correspondence. Or if a resource quantity is outside a predetermined range and the maximum TBS value mapping to the corresponding resource quantity in the second mapping relationship is smaller than the predetermined multiple of the second TBS value, a maximum TBS value corresponding to the resource quantity introduced from the second mapping relationship into the second correspondence is modified to a third TBS value.

The third TBS value is a maximum TBS value smaller than the predetermined multiple of the second TBS value in the second mapping relationship.

For example, there are 7 resource quantities supported by the first kind of terminal. One or more of the 7 resource quantities are within the predetermined range, and other resource quantities are outside the predetermined range.

If the resource quantity is within the predetermined range, the third TBS value is added on the basis of using the maximum TBS value determined previously. If the resource quantity is outside the predetermined range, the maximum TBS value determined previously is modified to the third TBS value directly.

In some embodiments, in the first mapping relationship, for at least part of resource quantities, different numbers of TBS values which can be supported by the first kind of terminal are included in the second correspondence. In this case, the TBS values not supported by the first kind of terminal can be introduced, such that for each resource quantity, the same number of TBS values are included in the first mapping relationship. As shown in Table 8, for each resource quantity, there are 20 TBS values in the first correspondence and the second correspondence. In this case, the base station does not schedule the TBS value which is introduced and not supported by the terminal. For example, in Table 8, the terminal supports receiving a data package with the TBS value of 1352 at most, the base station does not use the TBS value higher than 1352 to transmit the data package. The TBS value not used by the base station is the TBS value which is signed as not meeting a scheduling usage condition.

TABLE 8

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 696 |
| 5 | 72 | 144 | 224 | 328 | 424 | 504 | 680 | 872 |
| 6 | 328 | 176 | 256 | 392 | 504 | 600 | 808 | 1032 |
| 7 | 104 | 224 | 328 | 472 | 584 | 712 | 968 | $\underline{1288}$ $\underline{1352}$ |
| 8 | 120 | 256 | 392 | 536 | 680 | 808 | 1096 | 1384 |
| 9 | 136 | 296 | 456 | 616 | 776 | 936 | $\underline{1288}$ $\underline{1352}$ | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |

TABLE 8-continued

| $I_{TBS}$ | $I_{SF}$ | | | | | | | |
|---|---|---|---|---|---|---|---|---|
| | 0 | 1 | 2 | 3 | 4 | 5 | 6 | 7 |
| 13 | 224 | 488 | 744 | 1000 | $\underline{1288}$ $\underline{1352}$ | 1544 | 2024 | 2536 |
| 14 | 256 | 552 | 840 | 1128 | 1416 | 1736 | 2280 | 2856 |
| 15 | 280 | 600 | 904 | 1224 | 1544 | 1800 | 2472 | 3112 |
| 16 | 328 | 632 | 968 | $\underline{1288}$ $\underline{1352}$ | 1608 | 1928 | 2600 | 3240 |
| 17 | 336 | 696 | 1064 | 1416 | 1800 | 2152 | 2856 | 3624 |
| 18 | 376 | 776 | 1160 | 1544 | 1992 | 2344 | 3112 | 4008 |
| 19 | 408 | 840 | $\underline{1288}$ $\underline{1352}$ | 1736 | 2152 | 2600 | 3496 | 4264 |
| 20 | 440 | 904 | 1384 | 1864 | 2344 | 2792 | 3752 | 4584 |

Similar to Table 1-Table 7, each element in Table 8 exists independently. These elements are listed in the same table for example, but it does not mean that all elements in the table should exist at the same time, as shown in the table. The value of each element is independent on the value of any other element in Table 8. Thus, those skilled in the art may understand that the value of each element in Table 8 can be considered as an independent embodiment.

In some embodiments, in the first mapping relationship, all TBS values mapping to a resource quantity in the second correspondence meet the scheduling usage condition. The TBS value meeting the scheduling usage condition is the TBS value allowed to be used in the data transmission.

The following Table 9 is an example.

TABLE 9

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 696 |
| 5 | 72 | 144 | 224 | 328 | 424 | 504 | 680 | 872 |
| 6 | 328 | 176 | 256 | 392 | 504 | 600 | 808 | 1032 |
| 7 | 104 | 224 | 328 | 472 | 584 | 712 | 968 | $\underline{1288}$ $\underline{1352}$ |
| 8 | 120 | 256 | 392 | 536 | 680 | 808 | 1096 | |
| 9 | 136 | 296 | 456 | 616 | 776 | 936 | $\underline{1288}$ $\underline{1352}$ | |
| 10 | 144 | 328 | 504 | 680 | 872 | 1032 | | |
| 11 | 176 | 376 | 584 | 776 | 1000 | 1192 | | |
| 12 | 208 | 440 | 680 | 904 | 1128 | 1352 | | |
| 13 | 224 | 488 | 744 | 1000 | $\underline{1288}$ $\underline{1352}$ | | | |
| 14 | 256 | 552 | 840 | 1128 | | | | |
| 15 | 280 | 600 | 904 | 1224 | | | | |
| 16 | 328 | 632 | 968 | $\underline{1288}$ $\underline{1352}$ | | | | |
| 17 | 336 | 696 | 1064 | | | | | |
| 18 | 376 | 776 | 1160 | | | | | |
| 19 | 408 | 840 | $\underline{1288}$ $\underline{1352}$ | | | | | |
| 20 | 440 | 904 | 1384 | | | | | |

Similar to Table 1-Table 8, each element in Table 9 exists independently. These elements are listed in the same table for example, but it does not mean that all elements in the table should exist at the same time, as shown in the table. The value of each element is independent on the value of any other element in Table 9. Thus, those skilled in the art may understand that the value of each element in Table 9 can be considered as an independent embodiment.

It can be seen from Table 9 that for different resource quantities, the same number or different numbers of corresponding TBS values are included in the first mapping relationship.

In Table 8 and Table 9, $I_{SF}$ represents the resource quantity.

Figure 3:
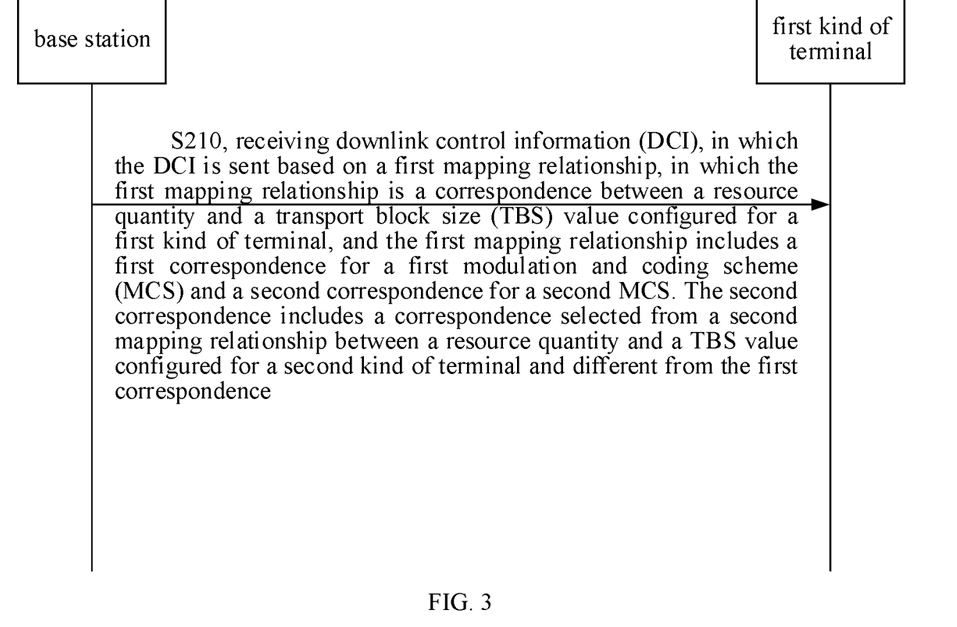
FIG. 3 is a flowchart illustrating a method for transmitting DCI according to an embodiment of the disclosure.

As illustrated in FIG. 3, the embodiments of the present disclosure provide a method for transmitting DCI. The method may include the followings.

At block S210, DCI is received. The DCI is sent based on a first mapping relationship. The first mapping relationship is a correspondence between a resource quantity and a transport block size (TBS) value configured for a first kind of terminal, and the first mapping relationship includes a first correspondence for a first modulation and coding scheme (MCS) and a second correspondence for a second MCS.

The second correspondence includes a correspondence selected from a second mapping relationship between a resource quantity and a TBS value configured for a second kind of terminal and different from the first correspondence.

In the embodiment, the first kind of terminal may receive the DCI. The DCI is sent by a base station based on the first mapping relationship. It may be determined based on an MSC field in the DCI whether the current DCI indicates the first correspondence or the second correspondence in the first mapping relationship. Further, it is determined which one of the first correspondence and the second correspondence is it.

In some embodiments, the TBS value mapping to a resource quantity in the second correspondence is greater than the TBS value mapping to the same resource quantity in the first correspondence.

In the embodiments of the disclosure, the resource quantity includes but is not limited to the number of physical resource blocks (PRBs), or the number of sub-frames/time slots/symbols.

The TBS which can be used by the terminal is a set of discrete positive integers specified by a protocol. Each TBS value in the set has a one-to-one correspondence with one certain TBS index and a certain resource quantity. The TBS index may be derived from the MCS index in the DCI based on a predetermined relationship. The resource quantity is indicated by the DCI.

In some embodiments, a minimum TBS value mapping to a resource quantity in the second correspondence is a minimum value selected from the second mapping relationship and greater than a maximum TBS value mapping to the same resource quantity in the first correspondence.

In some embodiments, a maximum TBS value mapping to a resource quantity in the second correspondence is a maximum value selected from the second mapping relationship and not greater than a predetermined multiple of a first TBS value mapping to the same resource quantity in the first correspondence.

In some embodiments, when the TBS value mapping to the same resource quantity in the first correspondence includes a second TBS value, the first TBS value is the second TBS value.

In some embodiments, when the TBS value mapping to the same resource quantity in the first correspondence does not include the second TBS value, the first TBS value is a maximum TBS value mapping to the same resource quantity in the first correspondence.

In the some embodiments, the TBS value mapping to a resource quantity in the second correspondence includes a minimum TBS value and a maximum TBS value.

The TBS value mapping to a resource quantity in the second correspondence further includes all TBS values between the minimum TBS value and the maximum TBS value, mapping to the corresponding resource quantity in the second mapping relationship.

Or, the TBS value mapping to a resource quantity in the second correspondence further includes a part of TBS values between the minimum TBS value and the maximum TBS value, mapping to the corresponding resource quantity in the second mapping relationship.

In some embodiments, when the TBS value mapping to a resource quantity in the first correspondence includes a second TBS value, the TBS value included in the second correspondence for the corresponding resource quantity is determined based on a size relation between a maximum TBS value mapping to the corresponding resource quantity in the second mapping relationship and a predetermined multiple of the second TBS value.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value as follows.

If the maximum TBS value mapping to the resource quantity in the second mapping relationship is smaller than the predetermined multiple of the second TBS value, a third TBS value included in the second mapping relationship is configured as the TBS value mapped in the second correspondence.

The third TBS value is a maximum TBS value smaller than the predetermined multiple of the second TBS value in the second mapping relationship.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value as follows.

If the maximum TBS value mapping to the resource quantity in the second mapping relationship is smaller than the predetermined multiple of the second TBS value, a maximum TBS value corresponding to the resource quantity introduced from the second mapping relationship into the second correspondence is modified to a third TBS value. The third TBS value is a maximum TBS value smaller than the predetermined multiple of the second TBS value in the second mapping relationship.

In some other embodiments, the TBS value included in the second correspondence for the corresponding resource quantity is determined based on the size relation between the maximum TBS value mapping to the corresponding resource quantity in the second mapping relationship and the predetermined multiple of the second TBS value as follows.

If a resource quantity is within a predetermined range and the maximum TBS value mapping to the corresponding resource quantity in the second mapping relationship is smaller than the predetermined multiple of the second TBS value, a third TBS value included in the second mapping relationship is configured as the TBS value mapped in the second correspondence. Or if a resource quantity is outside a predetermined range and the maximum TBS value mapping to the corresponding resource quantity in the second mapping relationship is smaller than the predetermined multiple of the second TBS value, a maximum TBS value corresponding to the resource quantity introduced from the second mapping relationship into the second correspondence is modified to a third TBS value.

The third TBS value is a maximum TBS value smaller than the predetermined multiple of the second TBS value in the second mapping relationship.

In some embodiments, in the first mapping relationship, one or more TBS values mapping to at least part of resource quantities in the second correspondence do not meet a scheduling usage condition. The TBS value meeting the scheduling usage condition is the TBS value allowed to be used in the data transmission.

In some embodiments, in the first mapping relationship, all TBS values mapping to a resource quantity in the second correspondence meet the scheduling usage condition.

The TBS value meeting the scheduling usage condition is the TBS value allowed to be used in the data transmission.

Figure 4:
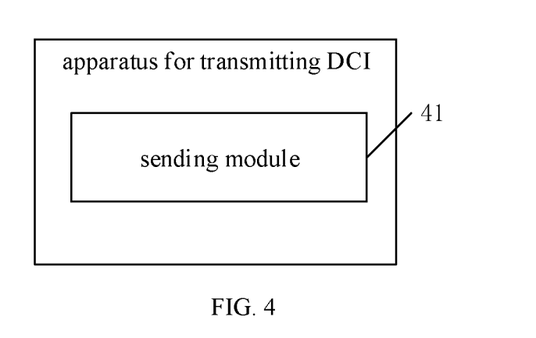
FIG. 4 is a block diagram illustrating an apparatus for transmitting DCI according to an embodiment of the disclosure.

As illustrated in FIG. 4, the embodiments of the disclosure provide an apparatus for transmitting DCI. The apparatus includes a sending module 41.

The sending module 41 is configured to send downlink control information (DCI) based on a first mapping relationship, in which the first mapping relationship is a correspondence between a resource quantity and a transport block size (TBS) value configured for a first kind of terminal, and the first mapping relationship includes a first correspondence for a first modulation and coding scheme (MCS) and a second correspondence for a second MCS.

The second correspondence includes a correspondence selected from a second mapping relationship between a resource quantity and a TBS value configured for a second kind of terminal and different from the first correspondence.

In some embodiments, the sending module 41 may be a program module which may be executed by a processor to implement the sending of the DCI based on the first mapping relationship.

In some embodiments, the sending module 41 may be a software and hardware combined module, which includes but is not limited to a programmable array, including but be not limited to a complex programmable array or a field programmable array.

In further embodiments, the sending module 41 may be a pure hardware module, which may include an application-specific integrated circuit.

In some embodiments, each TBS value mapping to a same resource quantity in the second correspondence is greater than each TBS value mapping to the same resource quantity in the first correspondence.

In some embodiments, a minimum TBS value mapping to a same resource quantity in the second correspondence is a minimum value selected from the second mapping relationship and greater than a maximum TBS value mapping to the same resource quantity in the first correspondence.

In some embodiments, a maximum TBS value mapping to a same resource quantity in the second correspondence is a maximum value selected from the second mapping relationship and not greater than a predetermined multiple of a first TBS value mapping to the same resource quantity in the first correspondence.

In some embodiments, when the TBS value mapping to the same resource quantity in the first correspondence includes a second TBS value, the first TBS value is the second TBS value.

In some embodiments, when the TBS value mapping to the same resource quantity in the first correspondence does not include the second TBS value, the first TBS value is a maximum TBS value mapping to the same resource quantity in the first correspondence.

In the some embodiments, the TBS value mapping to a resource quantity in the second correspondence includes a minimum TBS value and a maximum TBS value.

The TBS value mapping to a resource quantity in the second correspondence further includes all TBS values between the minimum TBS value and the maximum TBS value, mapping to the corresponding resource quantity in the second mapping relationship.

Or, the TBS value mapping to a resource quantity in the second correspondence further includes a part of TBS values between the minimum TBS value and the maximum TBS value, mapping to the corresponding resource quantity in the second mapping relationship.

In some embodiments, when the TBS value mapping to a resource quantity in the first correspondence includes a second TBS value, the TBS value included in the second correspondence for the corresponding resource quantity is determined based on a size relation between a maximum TBS value mapping to the corresponding resource quantity in the second mapping relationship and a predetermined multiple of the second TBS value.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value by performing: if the maximum TBS value mapping to the resource quantity in the second mapping relationship is smaller than the predetermined multiple of the second TBS value, configuring a third TBS value included in the second mapping relationship as the TBS value mapped in the second correspondence.

The third TBS value is a maximum TBS value smaller than the predetermined multiple of the second TBS value in the second mapping relationship.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value by performing: if the maximum TBS value mapping to the resource quantity in the second mapping relationship is smaller than the predetermined multiple of the second TBS value, modifying a maximum TBS value corresponding to the resource quantity introduced from the second mapping relationship into the second correspondence to a third TBS value. The third TBS value is a maximum TBS value smaller than the predetermined multiple of the second TBS value in the second mapping relationship.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value by performing: if a resource quantity is within a predetermined range and the maximum TBS value mapping to the corresponding resource quantity in the second mapping relationship is smaller than the predetermined multiple of the second TBS value, configuring a third TBS value included in the second mapping relationship as the TBS value mapped in the second correspondence; or if a resource quantity is outside a predetermined range and the maximum TBS value mapping to the corresponding resource quantity in the second mapping relationship is smaller than the predetermined multiple of the second TBS value, modifying a maximum TBS value corresponding to the resource quantity introduced from the second mapping relationship into the second correspondence to a third TBS value.

The third TBS value is a maximum TBS value smaller than the predetermined multiple of the second TBS value in the second mapping relationship.

In some embodiments, in the first mapping relationship, one or more TBS values mapping to at least part of resource quantities in the second correspondence do not meet a scheduling usage condition. The TBS value meeting the scheduling usage condition is the TBS value allowed to be used in the data transmission.

In some embodiments, in the first mapping relationship, all TBS values mapping to a resource quantity in the second correspondence meet the scheduling usage condition.

The TBS value meeting the scheduling usage condition is the TBS value allowed to be used in the data transmission.

Figure 5:
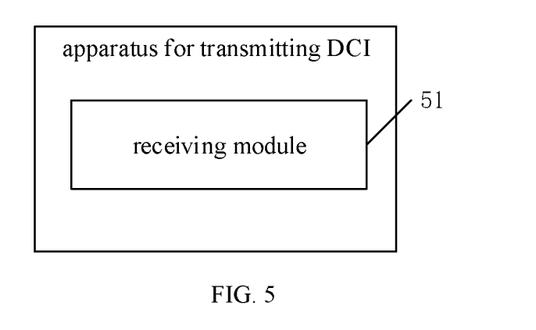
FIG. 5 is a block diagram illustrating an apparatus for transmitting DCI according to an embodiment of the disclosure.

As illustrated in FIG. 5, the embodiments of the disclosure provide an apparatus for transmitting DCI. The apparatus includes a receiving module 51.

The receiving module 51 is configured to receive downlink control information (DCI), in which the DCI is sent based on a first mapping relationship, in which the first mapping relationship is a correspondence between a resource quantity and a transport block size (TBS) value configured for a first kind of terminal, and the first mapping relationship includes a first correspondence for a first modulation and coding scheme (MCS) and a second correspondence for a second MCS.

The second correspondence includes a correspondence selected from a second mapping relationship between a resource quantity and a TBS value configured for a second kind of terminal and different from the first correspondence.

In some embodiments, the receiving module 51 may be a program module which may be executed by a processor to implement the receiving of the DCI based on the first mapping relationship.

In some embodiments, the receiving module 51 may be a software and hardware combined module, which includes but is not limited to a programmable array, including but be not limited to a complex programmable array or a field programmable array.

In further embodiments, the receiving module 51 may be a pure hardware module, which may include an application-specific integrated circuit.

In some embodiments, each TBS value mapping to a same resource quantity in the second correspondence is greater than each TBS value mapping to the same resource quantity in the first correspondence.

In some embodiments, a minimum TBS value mapping to a same resource quantity in the second correspondence is a minimum value selected from the second mapping relationship and greater than a maximum TBS value mapping to the same resource quantity in the first correspondence.

In some embodiments, a maximum TBS value mapping to a same resource quantity in the second correspondence is a maximum value selected from the second mapping relationship and not greater than a predetermined multiple of a first TBS value mapping to the same resource quantity in the first correspondence.

In some embodiments, when the TBS value mapping to the same resource quantity in the first correspondence includes a second TBS value, the first TBS value is the second TBS value.

In some embodiments, when the TBS value mapping to the same resource quantity in the first correspondence does not include the second TBS value, the first TBS value is a maximum TBS value mapping to the same resource quantity in the first correspondence.

In the some embodiments, the TBS value mapping to a resource quantity in the second correspondence includes a minimum TBS value and a maximum TBS value.

The TBS value mapping to a resource quantity in the second correspondence further includes all TBS values between the minimum TBS value and the maximum TBS value, mapping to the corresponding resource quantity in the second mapping relationship.

Or, the TBS value mapping to a resource quantity in the second correspondence further includes a part of TBS values between the minimum TBS value and the maximum TBS value, mapping to the corresponding resource quantity in the second mapping relationship.

In some embodiments, when the TBS value mapping to a resource quantity in the first correspondence includes a second TBS value, the TBS value included in the second correspondence for the corresponding resource quantity is determined based on a size relation between a maximum TBS value mapping to the corresponding resource quantity in the second mapping relationship and a predetermined multiple of the second TBS value.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value by performing: if the maximum TBS value mapping to the resource quantity in the second mapping relationship is smaller than the predetermined multiple of the second TBS value, configuring a third TBS value included in the second mapping relationship as the TBS value mapped in the second correspondence.

The third TBS value is a maximum TBS value smaller than the predetermined multiple of the second TBS value in the second mapping relationship.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value by performing: if the maximum TBS value mapping to the resource quantity in the second mapping relationship is smaller than the predetermined multiple of the second TBS value, modifying a maximum TBS value corresponding to the resource quantity introduced from the second mapping relationship into the second correspondence to a third TBS value. The third TBS value is a maximum TBS value smaller than the predetermined multiple of the second TBS value in the second mapping relationship.

In some embodiments, the TBS value included in the second correspondence for the corresponding resource quantity is determined based on the size relation between the maximum TBS value mapping to the corresponding resource quantity in the second mapping relationship and the predetermined multiple of the second TBS value by performing: if a resource quantity is within a predetermined range and the maximum TBS value mapping to the corresponding resource quantity in the second mapping relationship is smaller than the predetermined multiple of the second TBS value, configuring a third TBS value included in the second mapping relationship as the TBS value mapped in the second correspondence; or if a resource quantity is outside a predetermined range and the maximum TBS value mapping to the corresponding resource quantity in the second mapping relationship is smaller than the predetermined multiple of the second TBS value, modifying a maximum TBS value corresponding to the resource quantity introduced from the second mapping relationship into the second correspondence to a third TBS value.

The third TBS value is a maximum TBS value smaller than the predetermined multiple of the second TBS value in the second mapping relationship.

In some embodiments, in the first mapping relationship, one or more TBS values mapping to at least part of resource quantities in the second correspondence do not meet a scheduling usage condition. The TBS value meeting the scheduling usage condition is the TBS value allowed to be used in the data transmission.

In some embodiments, in the first mapping relationship, all TBS values mapping to a resource quantity in the second correspondence meet the scheduling usage condition.

The TBS value meeting the scheduling usage condition is the TBS value allowed to be used in the data transmission.

According to the embodiments, for the NB-IoT device, after introducing a new MCS, the TBS table is expanded to include the new MCS without adding the overhead of DCI. The newly introduced TBS value is an existing value in a current LTE TBS table.

For the same resource quantity, the newly introduced minimum TBS value supporting 16QAM is a minimum value greater than a maximum TBS under such resource assignment in the former release.

In detail, if there is the TBS value greater than 680 bit under a certain resource assignment in the TBS table for NB-IoT (the first mapping relationship in the table form), the minimum value greater than 680 is the minimum value supporting 16QAM. If there is no TBS value greater than 680 bit, it is determined based on the LTE TBS table, i.e., a minimum value greater than a maximum TBS for the same resource quantity under such resource assignment in the NB-IoT table is selected from the LTE TBS table, for example, referring to Table 10.

TABLE 10

| $I_{TBS}$ | $I_{SF}$ | | | | | | | |
|---|---|---|---|---|---|---|---|---|
| | 0 | 1 | 2 | 3 | 4 | 5 | 6 | 7 |
| | 256 | 552 | 744 | 776 | 776 | 808 | 808 | 872 |

Each element in Table 10 exists independently. These elements are listed in the same table for example, but it does not mean that all elements in the table should exist at the same time, as shown in the table. The value of each element is independent on the value of any other element in Table 10. Thus, those skilled in the art may understand that the value of each element in Table 10 can be considered as an independent embodiment.

A method for determining a newly introduced maximum TBS value supporting 16 QA for the same resource quantity is provided.

If there is TBS=680 under a certain resource assignment in a current NB-IoT table, the newly introduced maximum TBS value is a maximum value which is not greater than the double of 680 and supported by the current TBS.

It there is no 680 bit in NB-IoT, the newly introduced maximum TBS value is a maximum existing TBS value which is greater than a current maximum TBS value and not greater than the double of the maximum TBS value under a certain resource assignment.

The maximum TBSs supporting 16QAM under various resource assignments are shown in Table 11.

TABLE 11

| $I_{TBS}$ | $I_{SF}$ | | | | | | | |
|---|---|---|---|---|---|---|---|---|
| | 0 | 1 | 2 | 3 | 4 | 5 | 6 | 7 |
| | 440 | 904 | 1288 | 1288 | 1256 | 1352 | 1256 | 1224 |

Each element in Table 11 exists independently. These elements are listed in the same table for example, but it does not mean that all elements in the table should exist at the same time, as shown in the table. The value of each element is independent on the value of any other element in Table 11. Thus, those skilled in the art may understand that the value of each element in Table 11 can be considered as an independent embodiment.

Further, considering that the maximum value not greater than the double of 680 in the current LTE TBS table is 1352, the maximum TBS value supporting 16QAM may be changed to 1352 for the resource quantity of 680 bit included in the current TBS table, for example as shown in Table 12.

TABLE 12

| $I_{TBS}$ | $I_{SF}$ | | | | | | | |
|---|---|---|---|---|---|---|---|---|
| | 0 | 1 | 2 | 3 | 4 | 5 | 6 | 7 |
| | 440 | 904 | 1352 | 1352 | 1352 | 1352 | 1352 | 1352 |

Each element in Table 12 exists independently. These elements are listed in the same table for example, but it does not mean that all elements in the table should exist at the same time, as shown in the table. The value of each element is independent on the value of any other element in Table 12. Thus, those skilled in the art may understand that the value of each element in Table 12 can be considered as an independent embodiment.

Based on the maximum value and the minimum value determined to be supported, the number of TBS values needing to be introduced into the LTE TBS table is determined.

In a first way, direct expansion. The direct expansion is performed on the basis of the LTE TBS table. All TBSs greater than or equal to the supported minimum TBS and smaller than or equal to the supported maximum TBS under each determined resource assignment are introduced into a new TB. The newly introduced TBS supporting 16QAM is the red TBS in the following table.

In a second way, on the basis of the LTE TBS, a part of TBSs are extracted from the TBSs greater than or equal to the supported minimum TBS and smaller than or equal to the supported maximum TBS under each determined resource assignment, for example in the above table, for $I_{SF}$=0~3 (corresponding to $N_{PRB}$=1~4 in the LTE TBS table), only four TBSs are introduced into a new TBS table.

The maximum TBS value not greater than the double of 680 bit in the current LTE TBS table is 1352, such that a further correction can be made to the value in the TBS table. There are two ways as follows.

In a first way, under a certain resource assignment, if the previous TBS includes 680 bit, and the maximum value in the table expanded from the LTE TBS does not reach 1352, then TBS=1352 can be added to the TBS table.

In a second way, under a certain resource assignment, if the previous TBS includes 680 bit, and the maximum value in the table expanded from the LTE TBS does not reach 1352, then the maximum TBS can be modified to TBS=1352.

In a third way, which is a combination of the first way and the second way, for example, for $I_{SF}$=2, 3, 4 (corresponding to $N_{PRB}$=3, 4, 5 in the LTE TBS), the first way is adopted. For $I_{SF}$=6, 7, the second way is adopted.

Since different numbers of TBSs supporting 16QAM can be introduced under different resource assignments, there are two processing ways.

In a first way, the last introduced TBS table may be determined based on the introduced maximum TBS index, but the base station is restricted to merely schedule the TBS meeting a condition when a user is scheduled. Lastly, the following TBS is introduced in a protocol. For $I_{SF}$=0, the introduced TBS index is maximum, which may be TBS index=20. The following table is introduced in the protocol, i.e., under each resource assignment, there are TBS values corresponding to the TBS index=0~20, but the base station cannot use the value greater than 1352, referring to Table 7.

In a second way, the introduced TBS table does not include any value not meeting the condition, as shown in Table 8.

The embodiments of the disclosure further provide a communication device including an antenna, a memory and a processor. The processor is coupled to the antenna and the memory respectively, and configured to execute executable programs stored in the memory to control the antenna to receive and send wireless signals and perform the method for transmitting DCI according to any of the above-mentioned embodiments.

The communication device provided in the embodiment may be the terminal or the base station described above. The terminal may be various manned terminals or vehicle-mounted terminals. The base station may be any kind of base station, for example the 4G base station or 5G base station.

The antenna may be any kind of antenna, for example a mobile antenna such as the 3G antenna, 4G antenna or 5G antenna. The antenna may further include the WiFi antenna or the wireless charging antenna.

The memory may be any kind of storage medium. The storage medium may be a non-transitory computer storage medium, which may continually memory information stored thereon after the communication device is powered off.

The processor may be coupled to the antenna and the memory via the bus, configured to read executable programs storage on the memory to implement the method for transmitting DCI as illustrated in FIG. 2 and/or FIG. 3.

The embodiments of the disclosure provide a non-transitory computer storage medium. The non-transitory computer storage medium stores with executable programs. The executable programs are executed by a processor, and a method for transmitting DCI provided in any of the aforementioned embodiments can be implemented, for example at least one of the methods described with reference to FIG. 2 to FIG. 3 can be implemented.

Figure 6:
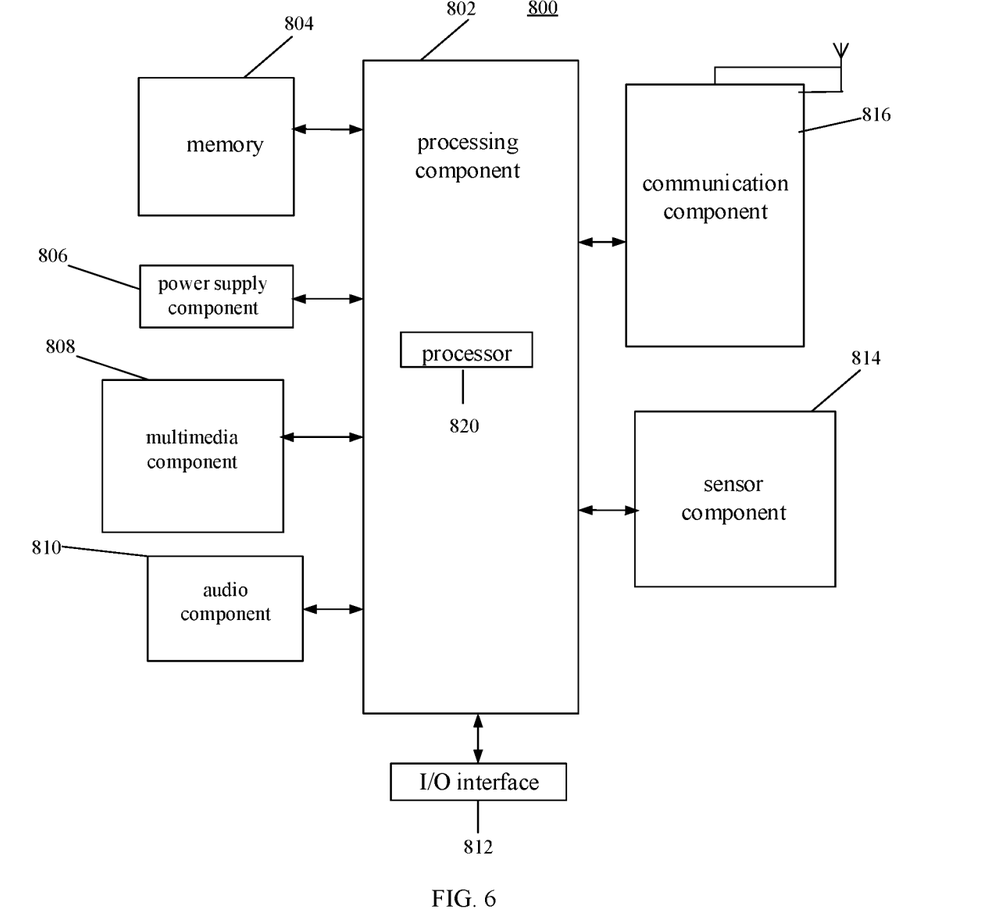
FIG. 6 is a schematic diagram illustrating a first kind of terminal according to an embodiment of the disclosure.

FIG. 6 is a block diagram illustrating a terminal 800. The embodiments of the disclosure provide the terminal 800. For example, the terminal 800 may be a mobile phone, a computer, a digital broadcasting UE, a messaging device, a game console, a tablet device, a medical equipment, a fitness equipment, a personal digital assistant, and so on.

Referring to FIG. 6, the terminal 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the terminal 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the terminal 800. Examples of the data include the instructions of any applications or methods operated on the terminal 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the terminal 800. The power supply component 806 may include a power supply management system, one or more power supplies, and other units related to generating, managing and distributing power for the terminal 800.

The multimedia component 808 includes an output interface screen provided between the terminal 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the terminal 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the terminal 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the terminal 800. For example, the sensor component 814 may detect the on/off state of the terminal 800 and the relative positioning of the component. For example, the component is a display and a keypad of the terminal 800. The sensor component 814 may further detect the location change of the terminal 800 or one component of the terminal 800, the presence or absence of contact between the user and the terminal 800, the orientation or acceleration/deceleration of the terminal 800, and the temperature change of the terminal 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the terminal 800 and other devices. The terminal 800 may access wireless networks based on communication standard, such as Wi-Fi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the terminal 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 804 including executable instructions, the executable instructions may be executed by the processor 820 of the terminal 800 to complete the above methods. For example, the non-transitory computer-readable storage medium may be a ROM, a random access memory (RAM), a CD-ROM, a magnetic tape, a floppy disk, an optical data storage device, etc.

The terminal may be used to implement the method for transmitting DCI described above, for example, the method for transmitting DCI described with reference FIG. 2 and/or FIG. 6.

Figure 7:
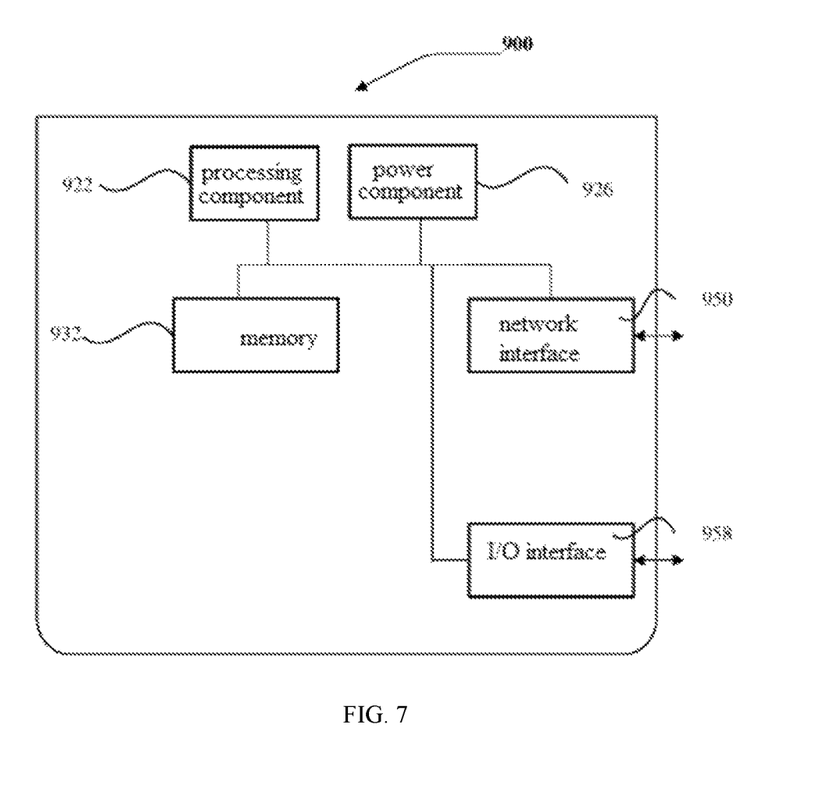
FIG. 7 is a schematic diagram illustrating a base station according to an embodiment of the disclosure.

FIG. 7 is a block diagram illustrating a base station 900 according to an embodiment. The base station 900 may be provided as a network side device. As illustrated in FIG. 7, the base station 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform any of the methods described with reference to FIG. 2 and/or FIG. 6.

The base station 900 may also include a power component 926 configured to perform power management of the base station 900, a wired or wireless network interface 950 configured to connect the base station 900 to a network, and an input output (I/O) interface 958. The base station 900 can operate based on an operating system stored in the memory 932, such as Windows Server™, Mac OS X™, Unix™, Linux™, FreeBSD™ or the like.

The wireless network interface 950 includes but is not limited to the antenna in the above described communication device. After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

The invention claimed is:

1. A method for transmitting downlink control information (DCI), comprising:
    sending downlink control information (DCI) based on a first mapping relationship, wherein the first mapping relationship is a correspondence between a resource quantity and a transport block size (TBS) value configured for a first kind of terminal, and the first mapping relationship comprises a first correspondence for a first modulation and coding scheme (MCS) and a second correspondence for a second MCS;
    wherein the second correspondence comprises a correspondence selected from a second mapping relationship between a resource quantity and a TBS value configured for a second kind of terminal and different from the first correspondence,
    wherein, each TBS value mapping to a same resource quantity in the second correspondence is greater than each TBS value mapping to the same resource quantity in the first correspondence.

2. The method of claim 1, wherein, a minimum TBS value mapping to the same resource quantity in the second correspondence is a minimum TBS value selected from the second mapping relationship and greater than a maximum TBS value mapping to the same resource quantity in the first correspondence.

3. The method of claim 1, wherein, a maximum TBS value mapping to a same resource quantity in the second correspondence is a maximum value selected from the second mapping relationship and not greater than a predetermined multiple of a first TBS value mapping to the same resource quantity in the first correspondence.

4. The method of claim 3, wherein, in response to the TBS value mapping to the same resource quantity in the first correspondence comprising a second TBS value, the first TBS value is the second TBS value.

5. The method of claim 3, wherein, in response to the TBS value mapping to the same resource quantity in the first correspondence not comprising a second TBS value, the first TBS value is a maximum TBS value mapping to the same resource quantity in the first correspondence.

6. The method of claim 1, wherein, a TBS value mapping to a resource quantity in the second correspondence comprises a minimum TBS value and a maximum TBS value;
a TBS value mapping to a resource quantity in the second correspondence further comprises one of the followings:
all TBS values between the minimum TBS value and the maximum TBS value, mapping to a corresponding resource quantity in the second mapping relationship;
a part of TBS values between the minimum TBS value and the maximum TBS value, mapping to a corresponding resource quantity in the second mapping relationship.

7. The method of claim 6, wherein, in response to a TBS value mapping to a resource quantity in the first correspondence comprising a second TBS value, a TBS value corresponding to the resource quantity in the second correspondence is determined based on a size relation between a maximum TBS value mapping to a corresponding resource quantity in the second mapping relationship and a predetermined multiple of the second TBS value.

8. The method of claim 7, wherein, the TBS value corresponding to the resource quantity in the second correspondence is determined based on the size relation between the maximum TBS value mapping to the corresponding resource quantity in the second mapping relationship and the predetermined multiple of the second TBS value by performing:
in response to the maximum TBS value mapping to the resource quantity in the second mapping relationship being smaller than the predetermined multiple of the second TBS value, determining a third TBS value comprised in the second mapping relationship as the TBS value mapping to the resource quantity in the second correspondence;
wherein, the third TBS value is a maximum TBS value smaller than the predetermined multiple of the second TBS value in the second mapping relationship.

9. The method of claim 7, wherein, the TBS value corresponding to the resource quantity in the second correspondence is determined based on the size relation between the maximum TBS value mapping to the corresponding resource quantity in the second mapping relationship and the predetermined multiple of the second TBS value by performing:
in response to the maximum TBS value mapping to the resource quantity in the second mapping relationship being smaller than the predetermined multiple of the second TBS value, modifying a maximum TBS value of the corresponding resource quantity introduced from the second mapping relationship into the second correspondence to a third TBS value;
wherein, the third TBS value is a maximum TBS value smaller than the predetermined multiple of the second TBS value in the second mapping relationship.

10. The method of claim 7, wherein, the TBS value corresponding to the resource quantity in the second correspondence is determined based on the size relation between the maximum TBS value mapping to the corresponding resource quantity in the second mapping relationship and the predetermined multiple of the second TBS value by performing one of the followings:
in response to the resource quantity being within a predetermined range and the maximum TBS value mapping to the corresponding resource quantity in the second mapping relationship being smaller than the predetermined multiple of the second TBS value, determining a third TBS value comprised in the second mapping relationship as the TBS value mapping to the corresponding resource quantity in the second correspondence;
in response to the resource quantity being outside a predetermined range and the maximum TBS value mapping to the corresponding resource quantity in the second mapping relationship being smaller than the predetermined multiple of the second TBS value, modifying a maximum TBS value of the corresponding resource quantity introduced from the second mapping relationship into the second correspondence to a third TBS value;
wherein, the third TBS value is a maximum TBS value smaller than the predetermined multiple of the second TBS value in the second mapping relationship.

11. The method of claim 1, wherein, in the first mapping relationship, one or more TBS value mapping to at least part of resource quantities in the second correspondence do not meet a scheduling usage condition, wherein the TBS value meeting the scheduling usage condition is allowed to be used in a data transmission.

12. The method of claim 1, wherein, in the first mapping relationship, each TBS value mapping to a resource quantity in the second correspondence meets a scheduling usage condition;
wherein the TBS value meeting the scheduling usage condition is allowed to be used in a data transmission.

13. The method of claim 12, wherein, in the first mapping relationship, one or more TBS value mapping to at least part of resource quantities in the second correspondence do not meet a scheduling usage condition, wherein the TBS value meeting the scheduling usage condition is allowed to be used in a data transmission.

14. The method of claim 12, wherein, in the first mapping relationship, each TBS value mapping to a resource quantity in the second correspondence meets a scheduling usage condition;
wherein the TBS value meeting the scheduling usage condition is allowed used in a data transmission.

15. A method for transmitting downlink control information (DCI), comprising:
receiving downlink control information (DCI), wherein the DCI is sent based on a first mapping relationship, wherein the first mapping relationship is a correspondence between a resource quantity and a transport block size (TBS) value configured for a first kind of terminal, and the first mapping relationship comprises a first correspondence for a first modulation and coding scheme (MCS) and a second correspondence for a second MCS;
wherein the second correspondence comprises a correspondence selected from a second mapping relationship between a resource quantity and a TBS value configured for a second kind of terminal and different from the first correspondence,
wherein, each TBS value mapping to a same resource quantity in the second correspondence is greater than each TBS value mapping to the same resource quantity in the first correspondence.

16. The method of claim 15, wherein, a maximum TBS value mapping to a same resource quantity in the second correspondence is a maximum value selected from the second mapping relationship and not greater than a predetermined multiple of a first TBS value mapping to the same resource quantity in the first correspondence.

17. The method of claim 15, wherein, a TBS value mapping to a resource quantity in the second correspondence comprises a minimum TBS value and a maximum TBS value;
- a TBS value mapping to a resource quantity in the second correspondence further comprises one of the followings:
- all TBS values between the minimum TBS value and the maximum TBS value, mapping to a corresponding resource quantity in the second mapping relationship;
- a part of TBS values between the minimum TBS value and the maximum TBS value, mapping to a corresponding resource quantity in the second mapping relationship.

18. A communication device, comprising:
an antenna;
a memory;
a processor, coupled to the antenna and the memory respectively, and configured to execute executable programs stored in the memory to control the antenna to receive and send wireless signals and perform:
sending downlink control information (DCI) based on a first mapping relationship, wherein the first mapping relationship is a correspondence between a resource quantity and a transport block size (TBS) value configured for a first kind of terminal, and the first mapping relationship comprises a first correspondence for a first modulation and coding scheme (MCS) and a second correspondence for a second MCS;
wherein the second correspondence comprises a correspondence selected from a second mapping relationship between a resource quantity and a TBS value configured for a second kind of terminal and different from the first correspondence,
wherein, each TBS value mapping to a same resource quantity in the second correspondence is greater than each TBS value mapping to the same resource quantity in the first correspondence.

* * * * *